US010616821B2

(12) United States Patent
Zhang

(10) Patent No.: US 10,616,821 B2
(45) Date of Patent: *Apr. 7, 2020

(54) METHOD FOR TRANSFERRING INFORMATION BETWEEN BASE STATION AND TERMINAL, BASE STATION, TERMINAL, AND SYSTEM

(71) Applicant: Huawei Technologies Co., Ltd., Shenzhen (CN)

(72) Inventor: Xiangdong Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/414,495

(22) Filed: May 16, 2019

(65) Prior Publication Data
US 2019/0274090 A1 Sep. 5, 2019

Related U.S. Application Data

(63) Continuation of application No. 15/849,608, filed on Dec. 20, 2017, now Pat. No. 10,334,506, which is a continuation of application No. 15/365,206, filed on Nov. 30, 2016, now Pat. No. 9,872,229, which is a continuation of application No. 14/869,664, filed on Sep. 29, 2015, now Pat. No. 9,532,300, which is a continuation of application No. PCT/CN2014/074502, filed on Apr. 1, 2014.

(30) Foreign Application Priority Data

Apr. 5, 2013 (CN) .......................... 2013 1 0137854

(51) Int. Cl.
H04W 48/10 (2009.01)
H04W 48/12 (2009.01)
H04W 48/16 (2009.01)

(52) U.S. Cl.
CPC ........... *H04W 48/10* (2013.01); *H04W 48/12* (2013.01); *H04W 48/16* (2013.01)

(58) Field of Classification Search
CPC ....... H04W 4/70; H04W 48/10; H04W 48/12; H04W 48/08; H04W 48/14
See application file for complete search history.

(56) References Cited

U.S. PATENT DOCUMENTS

| 9,532,300 | B2 * | 12/2016 | Zhang | H04W 48/10 |
| 9,872,229 | B2 * | 1/2018 | Zhang | H04W 48/10 |
| 10,334,506 | B2 * | 6/2019 | Zhang | H04W 48/10 |
| 2017/0126306 | A1 * | 5/2017 | Kim | H04W 76/14 |

* cited by examiner

*Primary Examiner* — Diane D Mizrahi
(74) *Attorney, Agent, or Firm* — Conley Rose, P.C.

(57) ABSTRACT

A base station, a terminal, a system, and a method for transferring information between the base station and the terminal includes receiving a broadcast channel, where the broadcast channel is used to transfer basic physical layer configuration information of a cell and to transfer first specific content agreed between the terminal and the base station, wherein the first specific content includes configuration information required by the terminal to access a network; and parsing out the first specific content from the broadcast channel.

22 Claims, 6 Drawing Sheets

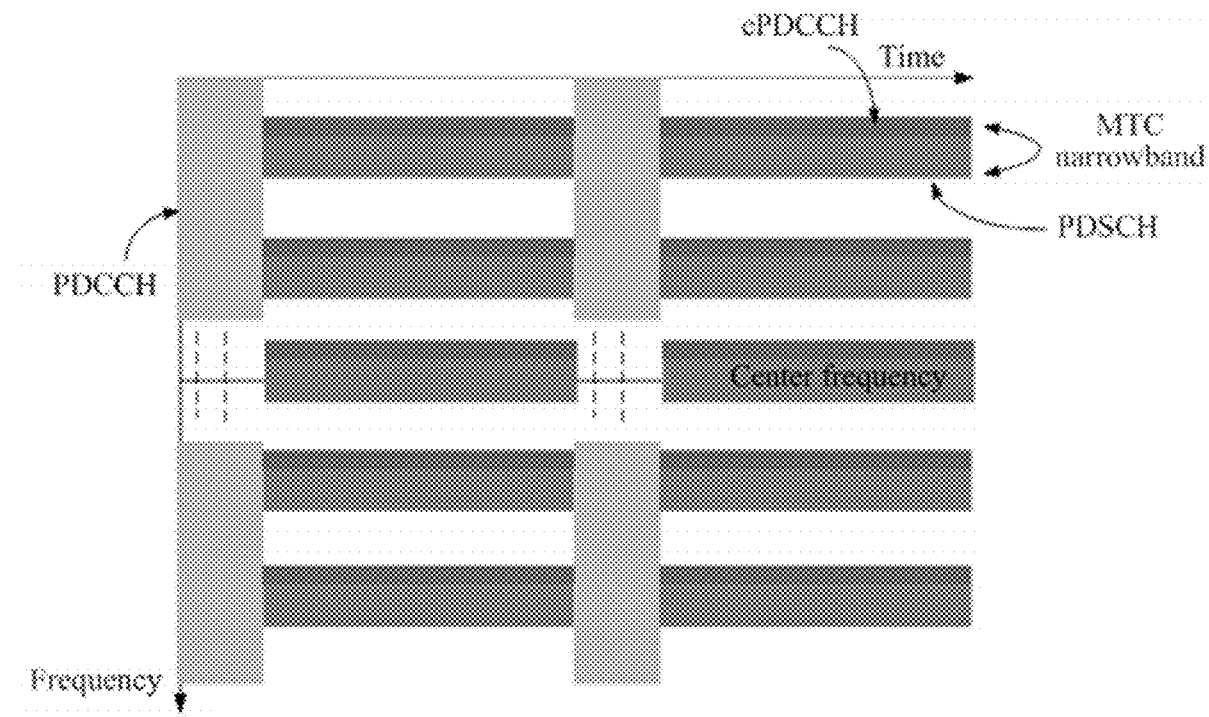

FIG. 1

| Receive a broadcast channel, where the broadcast channel is not only used for transferring basic physical layer configuration information of a cell, but also used for transferring first specific content agreed between a terminal and a base station, and the first specific content is used for transferring configuration information required by the terminal to access a network | 201 |

| Parse out the first specific content from the broadcast channel | 202 |

FIG. 2

METHOD FOR TRANSFERRING INFORMATION BETWEEN BASE STATION AND TERMINAL, BASE STATION, TERMINAL, AND SYSTEM

CROSS-REFERENCE TO RELATED APPLICATIONS

This application is a continuation of U.S. patent application Ser. No. 15/849,608, filed on Dec. 20, 2017, which is a continuation of U.S. patent application Ser. No. 15/365,206, filed on Nov. 30, 2016, now U.S. Pat. No. 9,872,229, which is a continuation of U.S. patent application Ser. No. 14/869,664, filed on Sep. 29, 2015, now U.S. Pat. No. 9,532,300, which is a continuation of International Application No. PCT/CN2014/074502, filed on Apr. 1, 2014, which claims priority to Chinese Patent Application No. 201310137854.X, filed on Apr. 5, 2013. All of the aforementioned patent applications are hereby incorporated by reference in their entireties.

TECHNICAL FIELD

The present application relates to the field of communications technologies, and in particular, to a method for transferring information between a base station and a terminal, a base station, a terminal, and a system.

BACKGROUND

The 3rd Generation Partnership Project (3GPP) Long Term Evolution (LTE) project is the largest new-technology research and development project launched by the 3GPP in recent years. Such a network using Orthogonal Frequency Division Multiplexing/Frequency Division Multiple Access (OFDM/FDMA) as a core technology may be considered as a "quasi-4G" network, and is greatly advantageous over another network. Therefore, an operator gradually expands deployment of a 3GPP LTE network.

In addition, to reduce maintenance costs of an entire network, the operator also gradually reduces maintenance on another network, for example, reduces services of a Global System for Mobile Communication/General Packet Radio Service (GSM/GPRS) network.

The Internet of Things (IoT) refers to a network in which information about the physical world is acquired by deploying various devices having sense, computation, execution, and communication capabilities, and information transmission, collaboration, and processing are implemented using a network, in order to implement interconnection between a human and a thing and between one thing and another thing. Possible applications include various aspects such as a smart grid, intelligent agriculture, intelligent transportation, and environmental monitoring. The development of the Internet of Things is honored as the third wave of the information industry after the computer and the Internet, on which great expectations are held, and the Internet of Things is extremely popular and valued in research institutions and the industry. In addition, a related standard organization also starts work of standardization of related technologies of the Internet of Things.

Machine-to-Machine (M2M) is a technology and standardization concept proposed by the 3GPP to study how to carry an application of the Internet of Things on a mobile communication network, and a specialized project group is set up to study enhancement or optimization that needs to be performed on the mobile communication network because of introduction of an M2M communication (MTC) device. The reason is that because a terminal in a GSM/GPRS network has a low price, most M2M application providers are more inclined to provide an M2M service using the GSM/GPRS network based on a GSM/GPRS terminal, which conflicts with the foregoing network planning and deployment of the operator. The operator hopes that an LTE network based terminal whose costs are comparable to costs of the GSM/GPRS terminal or even lower than the costs of the GSM/GPRS terminal can be provided, to attract an M2M service provider to select an LTE network to provide an M2M service, thereby implementing migration of an M2M application from a GSM/GRPS network to the LTE network.

Provision of low-cost MTC user equipments (UEs) based on LTE (provision of low-cost MTC UEs based on LTE) is exactly a project group that aims to reduce costs of an LTE terminal to enhance support from an LTE network to an M2M application. The project group proposes that reducing transmitting/receiving bandwidth supported by an LTE terminal can effectively decrease costs of the LTE terminal. A terminal whose supported transmitting/receiving bandwidth is reduced is referred to as a narrowband terminal.

A possible implementation method for supporting a narrowband terminal in a system is dividing a broadband of the system into multiple narrow bands. As shown in FIG. 1, each narrowband obtained through division includes a control channel and/or a data channel, for example, an Enhanced Physical Downlink Control Channel (ePDCCH) and/or a Physical Downlink Shared Channel (PDSCH).

If the foregoing narrowband terminal cannot receive a conventional Physical Downlink Control Channel (PDCCH) but can receive only an ePDCCH, how to effectively notify the narrowband terminal of information such as division of the foregoing narrowbands and a configuration of the ePDCCH is a problem that needs to be resolved.

In addition, application scenarios of some narrowband terminals are relatively special. For example, for an intelligent instrument in a basement, because of a relatively large penetration loss, a space loss is relatively large, and to provide an effective service to the intelligent instrument, targeted coverage enhancement needs to be performed on the intelligent instrument, for example, transmission is repeated multiple times. Moreover, these terminals are generally in a static or low-speed moving state, and some conventional system information, for example, system information about system bandwidth and system information about mobility management, may become meaningless to these terminals. A possible method is reorganizing all necessary system information, to form one piece of comprehensive system information for the foregoing narrowband terminal for centralized transmission. How to effectively send the foregoing comprehensive system information is also a problem that needs to be resolved.

For an New Carrier Type (NCT) technology that does not support a conventional PDCCH but supports only an ePDCCH, how a terminal acquires ePDCCH configuration information on a corresponding carrier is also a problem that needs to be resolved.

In other approaches, for narrowband configuration information, ePDCCH configuration information, and comprehensive system information configuration information of the narrowband terminal, and for ePDCCH configuration information of the NCT technology, a method in which a location that is pre-defined and fixed is used as a location of an MTC narrowband, comprehensive system information, or an ePDCCH, or as a location for sending an MTC narrowband, comprehensive system information, or ePDCCH configuration information is used, such that the terminal may obtain information about a narrowband, comprehensive system information, and/or an ePDCCH from the foregoing predefined and fixed location.

The solution in the other approaches lacks flexibility. Because of the existence of frequency selective fading, the fixed location may cause that the foregoing information or configuration information is in a relatively poor channel state for a long time, and the terminal cannot effectively acquire the information or the configuration information; moreover, for a narrowband terminal that requires coverage enhancement, because system information or comprehensive system information is sent by scheduling a control channel, in a coverage enhancement scenario, the control channel also needs to be enhanced. Therefore, to send the foregoing system information or comprehensive system information, the control channel for the system information or the comprehensive system information needs to be scheduled to perform transmission multiple times. On one hand, resources are wasted; and on the other hand, because the control channel that is sent multiple times may also be incorrectly interpreted, a higher error probability is caused, thereby increasing a time for distributing the system information.

SUMMARY

In view of this, embodiments of the present application provide a method for transferring information between a base station and a terminal, a base station, a terminal, and a system, which diversify manners for transferring information between a base station and a terminal.

According to a first aspect, an embodiment of the present application provides a method for transferring information between a base station and a terminal, including receiving a broadcast channel, where the broadcast channel is not only used for transferring basic physical layer configuration information of a cell, but also used for transferring first specific content agreed between the terminal and the base station, and the first specific content is used for transferring configuration information required by the terminal to access a network; and parsing out the first specific content from the broadcast channel.

According to a second aspect, with reference to a possible implementation manner of the first aspect, a broadband of the cell is divided into multiple narrowbands, the first specific content includes narrowband configuration information, the parsing out the first specific content from the broadcast channel includes parsing out the narrowband configuration information from the first specific content, and the method further includes performing frequency hopping among the multiple narrowbands or in an entire frequency band according to the narrowband configuration information that is parsed out, and selecting a narrowband or a frequency range with a good signal to camp on.

According to a third aspect, with reference to a possible implementation manner of the first aspect or second aspect, the narrowband configuration information includes at least one of information about a narrowband location, information about a quantity of the narrowbands, and information about narrowband composition.

According to a fourth aspect, with reference to possible implementation manners of the first aspect to the third aspect, the broadband of the cell or a narrowband obtained through division includes an ePDCCH, the first specific content further includes ePDCCH configuration information, parsing out the first specific content from the broadcast channel further includes parsing out the ePDCCH configuration information from the broadcast channel, and the method further includes determining a used ePDCCH according to the ePDCCH configuration information; and listening on the used ePDCCH, and receiving a PDSCH according to the ePDCCH.

According to a fifth aspect, with reference to a possible implementation manner of the first aspect, the first specific content further includes comprehensive system information including some or all content of system information, parsing out the first specific content from the broadcast channel further includes parsing out the comprehensive system information from the first specific content, and the method further includes acquiring system configuration information according to the comprehensive system information.

According to a sixth aspect, with reference to a possible implementation manner of the first aspect, the first specific content includes first control information, the first control information indicates a manner in which the terminal acquires second specific content, the second specific content is used for transferring the configuration information required by the terminal to access the network, and the method further includes parsing out the first control information from the first specific content; and receiving the second specific content in the manner indicated in the first control information.

According to a seventh aspect, with reference to a possible implementation manner of the sixth aspect, the second specific content further includes a setting manner of the specific content, the parsing out the specific content from the broadcast channel is parsing out the specific content from the broadcast channel in the setting manner of the specific content.

According to an eighth aspect, with reference to a possible implementation manner of the sixth aspect or seventh aspect, the narrowband configuration information includes at least one of information about a narrowband location, information about a quantity of the narrowbands, and information about narrowband composition.

According to a ninth aspect, with reference to a possible implementation manner of the eighth aspect, the broadband of the cell or a narrowband obtained through division includes an ePDCCH, the second specific content further includes ePDCCH configuration information, receiving the second specific content in the manner indicated in the first control information further includes parsing out the ePDCCH configuration information from the broadcast channel in the manner indicated in the first control information, and the method further includes determining a used ePDCCH according to the ePDCCH configuration information; and listening on the used ePDCCH, and receiving a PDSCH according to the ePDCCH.

According to a tenth aspect, with reference to possible implementation manners of the first aspect to the tenth aspect, the second specific content further includes comprehensive system information including some or all content of system information, and parsing out the second specific content from the broadcast channel further includes parsing out, from the second specific content, the comprehensive system information including the some or all content of the system information.

According to an eleventh aspect, with reference to a possible implementation manner of the second aspect, or third aspect, or fourth aspect, or tenth aspect, the first control information includes information about a time-frequency resource used by the terminal to receive the second specific content, and receiving the second specific content in the manner indicated in the first control information includes when the time-frequency resource for receiving the second specific content is a broadcast channel, parsing out the second specific content from the broadcast channel; and when the time-frequency resource for receiving the second specific content is another time-frequency resource, receiving, from the other time-frequency resource, the second specific content sent by the base station.

According to a twelfth aspect, with reference to a possible implementation manner of the fourth aspect or tenth aspect, the first control information further includes at least one of a coding scheme and a redundancy version of the second specific content, and the receiving the second specific content in the manner indicated in the first control information includes parsing out the second specific content from the broadcast channel according to the coding scheme and the redundancy version in the first control information.

According to a thirteenth aspect, with reference to possible implementation manners of the first aspect to the tenth aspect, the second specific content includes second control information, the second control information indicates a manner in which the terminal acquires third specific content, the third specific content is used for transferring the configuration information required by the terminal to access the network, and the method further includes parsing out the second control information from the second specific content; and receiving the third specific content in the manner indicated in the second control information.

According to a fourteenth aspect, with reference to a possible implementation manner of the seventh aspect or tenth aspect, the second control information includes information about a time-frequency resource used by the terminal to receive the third specific content, and receiving the third specific content in the manner indicated in the second control information includes, when the time-frequency resource for receiving the third specific content is a broadcast channel, parsing out the third specific content from the broadcast channel; and when the time-frequency resource for receiving the third specific content is another time-frequency resource, receiving, from the other time-frequency resource, the third specific content sent by the base station.

According to a fifteenth aspect, with reference to possible implementation manners of the first aspect to the fourteenth aspect, the second control information further includes at least one of a coding scheme and a redundancy version of the third specific content, and the parsing out the third specific content from the broadcast channel is parsing out the third specific content from the broadcast channel according to the coding scheme and the redundancy version in the second control information.

According to a sixteenth aspect, with reference to possible implementation manners of the first aspect to the fifteenth aspect, a broadband of the cell is divided into multiple narrowbands, the third specific content includes narrowband configuration information, the parsing out the third specific content from the broadcast channel includes parsing out the narrowband configuration information from the third specific content, and the method further includes performing frequency hopping among the multiple narrowbands or in an entire frequency band according to the narrowband configuration information that is parsed out, and selecting a narrowband or a frequency range with a good signal to camp on.

According to a seventeenth aspect, the narrowband configuration information includes at least one of information about a narrowband location, information about a quantity of the narrowbands, and information about narrowband composition.

According to an eighteenth aspect, with reference to a possible implementation manner of the sixteenth aspect or seventeenth aspect, the broadband of the cell or a narrowband obtained through division includes an ePDCCH, the third specific content further includes ePDCCH configuration information, the parsing out the third specific content from the broadcast channel further includes parsing out the ePDCCH configuration information from the broadcast channel, and the method further includes determining a used ePDCCH according to the ePDCCH configuration information; and listening on the used ePDCCH, and receiving a PDSCH according to the ePDCCH.

According to a nineteenth aspect, with reference to any aspect of the thirteenth aspect to the eighteenth aspect, the third specific content further includes comprehensive system information including some or all content of system information, and parsing out the third specific content from the broadcast channel further includes parsing out, from the third specific content, the comprehensive system information including the some or all content of the system information.

According to a twentieth aspect, with reference to any implementation manner of the thirteenth aspect to the nineteenth aspect, the first specific content, the second specific content, and the third specific content are indicated using any bit in binary code identifying the broadcast channel.

According to a twenty-first aspect, with reference to the second aspect to the fifth aspect, or the seventh aspect to the tenth aspect, or the sixteenth aspect to the twentieth aspect, the narrowband configuration information includes information about a narrowband location, and the narrowband location is obtained by the base station through division according to the broadcast channel.

According to a twenty-second aspect, with reference to the fourth aspect, or the ninth aspect, or the eighteenth aspect, the ePDCCH configuration information includes information about an ePDCCH location, and the ePDCCH location is obtained by the base station through division according to the broadcast channel.

According to a twenty-third aspect, with reference to any possible implementation manner of the thirteenth aspect to the twenty-second aspect, the time-frequency resource in the first control information and used by the terminal to receive the second specific content and/or the time-frequency resource in the second control information and used by the terminal to receive the third specific content is obtained by the base station through division according to the broadcast channel.

According to a twenty-fourth aspect, with reference to any possible implementation manner of the first aspect to the twenty-third aspect, the parsing out the first specific content from the broadcast channel includes determining whether the first specific content is required; and if the first specific content is required, parsing out the first specific content from the broadcast channel.

According to a twenty-fifth aspect, with reference to any possible implementation manner of the first aspect to the twenty-fourth aspect, the broadcast channel is a PBCH or an ePBCH.

According to a twenty-sixth aspect, with reference to any implementation manner of the thirteenth aspect to the twenty-second aspect, the coding scheme and the redundancy version of the second specific content in the first control information and/or the coding scheme and the redundancy version of the third specific content in the second control information are obtained by the base station through division according to the broadcast channel.

According to a twenty-seventh aspect, an embodiment of the present application provides a terminal, including a first receiving unit configured to receive a broadcast channel, and send the received broadcast channel to a first parsing unit, where the broadcast channel is not only used for transferring basic physical layer configuration information of a cell, but also used for transferring first specific content agreed between the terminal and a base station, and the first specific content is used for transferring configuration information required by the terminal to access a network; and the first parsing unit configured to receive the broadcast channel sent by the first receiving unit, and parse out the first specific content from the broadcast channel.

According to a twenty-eighth aspect, with reference to a possible implementation manner of the twenty-seventh aspect, a broadband of the cell is divided into multiple narrowbands, and the first specific content includes narrowband configuration information, and the first parsing unit includes a first parsing subunit configured to parse out the narrowband configuration information from the first specific content, and the terminal further includes a first frequency modulation unit configured to perform frequency hopping among the multiple narrowbands or in an entire frequency band according to the narrowband configuration information that is parsed out, and select a narrowband or a frequency range with a good signal to camp on.

According to a twenty-ninth aspect, with reference to a possible implementation manner of the twenty-eighth aspect, the narrowband configuration information includes at least one of information about a narrowband location, information about a quantity of the narrowbands, and information about narrowband composition.

According to a thirtieth aspect, with reference to a possible implementation manner of the twenty-eighth aspect or twenty-ninth aspect, the broadband of the cell or a narrowband obtained through division includes an ePDCCH, and the first specific content further includes ePDCCH configuration information, and the first parsing unit further includes a second parsing subunit configured to parse out the ePDCCH configuration information from the broadcast channel, and the terminal further includes a first determining unit configured to determine a used ePDCCH according to the ePDCCH configuration information; and a first listening unit configured to listen on the used ePDCCH, and receive a PDSCH according to the ePDCCH.

According to a thirty-first aspect, with reference to possible implementation manners of the twenty-seventh aspect to the thirtieth aspect, the first specific content further includes comprehensive system information including some or all content of system information, and the first parsing unit further includes a third parsing subunit configured to parse out the comprehensive system information from the first specific content, and the terminal includes an first acquiring unit configured to acquire system configuration information according to the comprehensive system information.

According to a thirty-second aspect, with reference to a possible implementation manner of the twenty-seventh aspect, the first specific content includes first control information, the first control information indicates a manner in which the terminal acquires second specific content, and the terminal further includes a second parsing unit configured to receive the first specific content sent by the first parsing unit, parse out the first control information from the first specific content, and send the first control information that is parsed out to a second receiving unit; and the second receiving unit configured to receive the first control information sent by the second parsing unit, and receive the second specific content in the manner indicated in the first control information.

According to a thirty-third aspect, with reference to a possible implementation manner of the thirty-second aspect, a broadband of the cell is divided into multiple narrowbands, and the second specific content includes narrowband configuration information, and the second receiving unit includes a fourth parsing subunit configured to parse out the narrowband configuration information from the second specific content, and the terminal further includes a second frequency modulation unit configured to perform frequency hopping among the multiple narrowbands or in an entire frequency band according to the narrowband configuration information that is parsed out, and select a narrowband or a frequency range with a good signal to camp on.

According to a thirty-fourth aspect, with reference to a possible implementation manner of the thirty-third aspect, the narrowband configuration information includes at least one of information about a narrowband location, information about a quantity of the narrowbands, and information about narrowband composition.

According to a thirty-fifth aspect, with reference to a possible implementation manner of the thirty-third aspect or thirty-fourth aspect, the broadband of the cell or a narrowband obtained through division includes an ePDCCH, and the second specific content further includes ePDCCH configuration information, the second receiving unit further includes a fifth parsing subunit configured to parse out the ePDCCH configuration information from the broadcast channel, and the terminal further includes a second determining unit configured to determine a used ePDCCH according to the ePDCCH configuration information; and a second listening unit configured to listen on the used ePDCCH, and receive a PDSCH according to the ePDCCH.

According to a thirty-sixth aspect, with reference to possible implementation manners of the thirty-third aspect to the thirty-fifth aspect, the second specific content further includes comprehensive system information including some or all content of system information, and the second receiving unit further includes a sixth parsing subunit configured to parse out, from the second specific content, the comprehensive system information including the some or all content of the system information; and a second acquiring subunit configured to acquire system configuration information according to the comprehensive system information.

According to a thirty-seventh aspect, with reference to a possible implementation manner of the thirty-second aspect, the first control information includes information about a time-frequency resource used by the terminal to receive the second specific content, and the second receiving unit further includes a first receiving subunit configured to, when the time-frequency resource for receiving the second specific content is a broadcast channel, parse out the second specific content from the broadcast channel; and a second receiving subunit configured to, when the time-frequency resource for receiving the second specific content is another time-frequency resource, receive, from the other time-frequency resource, the second specific content sent by the base station.

According to a thirty-eighth aspect, with reference to a possible implementation manner of the thirty-seventh aspect, the first control information further includes at least one of a coding scheme and a redundancy version of the second specific content, and the parsing out, by the first receiving subunit, the second specific content from the broadcast channel is parsing out, by the first receiving subunit, the second specific content from the broadcast channel according to the coding scheme and the redundancy version in the first control information.

According to a thirty-ninth aspect, with reference to a possible implementation manner of the thirtieth aspect, thirty-seventh aspect, or thirty-eighth aspect, the second specific content includes second control information, the second control information indicates a manner in which the terminal acquires third specific content, and the terminal further includes a third parsing unit configured to receive the second specific content sent by the second receiving unit, parse out the second control information from the second specific content, and send the second control information that is parsed out to a third receiving unit; and the third receiving unit configured to receive the second control information sent by the third parsing unit, and receive the third specific content in the manner indicated in the second control information.

According to a fortieth aspect, with reference to a possible implementation manner of the thirty-ninth aspect, the second control information includes information about a time-frequency resource used by the terminal to receive the third specific content, and the third receiving unit includes a third receiving subunit configured to, when the time-frequency resource for receiving the third specific content is a broadcast channel, parse out the third specific content from the broadcast channel; and a fourth receiving subunit configured to, when the time-frequency resource for receiving the third specific content is another time-frequency resource, receive, from the other time-frequency resource, the third specific content sent by the base station.

According to a forty-first aspect, with reference to a possible implementation manner of the fortieth aspect, the second control information further includes at least one of a coding scheme and a redundancy version of the third specific content, and the parsing out, by the third receiving subunit, the third specific content from the broadcast channel is parsing out, by the third receiving subunit, the third specific content from the broadcast channel according to the coding scheme and the redundancy version in the second control information.

According to a forty-second aspect, with reference to a possible implementation manner of the forty-first aspect, a broadband of the cell is divided into multiple narrowbands, and the third specific content includes narrowband configuration information, and the terminal further includes a third frequency modulation unit configured to perform frequency hopping among the multiple narrowbands or in an entire frequency band according to the narrowband configuration information that is parsed out, and select a narrowband or a frequency range with a good signal to camp on.

According to a forty-third aspect, with reference to a possible implementation manner of the forty-second aspect, the narrowband configuration information includes at least one of information about a narrowband location, information about a quantity of the narrowbands, and information about narrowband composition.

According to a forty-fourth aspect, with reference to a possible implementation manner of the forty-second aspect or forty-third aspect, the broadband of the cell or a narrowband obtained through division includes an ePDCCH, the third specific content further includes ePDCCH configuration information, the parsing out, by the third receiving subunit, the third specific content from the broadcast channel further includes parsing out, by the third receiving subunit, the ePDCCH configuration information from the broadcast channel, and the terminal further includes a third determining unit configured to determine a used ePDCCH according to the ePDCCH configuration information, and send information about the determined used ePDCCH to a listening unit; and a third listening unit configured to receive the ePDCCH information sent by the determining unit, listen on the used ePDCCH, and receive a PDSCH according to the ePDCCH.

According to a forty-fifth aspect, with reference to any possible implementation manner of the thirty-ninth aspect to the forty-fourth aspect, the third specific content further includes comprehensive system information including some or all content of system information, and the third receiving unit further includes a seventh parsing subunit configured to parse out the system configuration information from the third specific content; and a third acquiring subunit configured to acquire system configuration information according to the comprehensive system information.

According to a forty-sixth aspect, with reference to any possible implementation manner of the thirty-ninth aspect to the forty-fifth aspect, the first specific content, the second specific content, and the third specific content are indicated using a reserved bit in binary code identifying the broadcast channel.

According to a forty-seventh aspect, with reference to a possible implementation manner of the twenty-eighth aspect, thirty-third aspect, or forty-second aspect, the narrowband configuration information includes information about a narrowband location, and the narrowband location is obtained by the base station through division according to the broadcast channel.

According to a forty-eighth aspect, with reference to a possible implementation manner of the thirtieth aspect, thirty-first aspect, or thirty-second aspect, the ePDCCH configuration information includes information about an ePDCCH location, and the ePDCCH location is obtained by the base station through division according to the broadcast channel.

According to a forty-ninth aspect, with reference to possible implementation manners of the thirty-second aspect to the thirty-eighth aspect, the time-frequency resource in the first control information and used by the terminal to receive the second specific content and/or the time-frequency resource in the second control information and used by the terminal to receive the third specific content is obtained by the base station through division according to the broadcast channel.

According to a fiftieth aspect, with reference to any possible implementation manner of the twenty-ninth aspect to the forty-ninth aspect, the first parsing unit includes a determining subunit configured to determine whether the first specific content is required, and if the first specific content is required, send an indication to a parsing subunit; and the parsing subunit configured to, after receiving the indication sent by the determining subunit, parse out the first specific content from the broadcast channel.

According to a fifty-first aspect, with reference to any possible implementation manner of the twenty-ninth aspect to the fiftieth aspect, the broadcast channel is a PBCH or an ePBCH.

According to a fifty-second aspect, with reference to any implementation manner of the thirtieth aspect to the fifty-first aspect, the coding scheme and the redundancy version of the second specific content in the first control information and/or the coding scheme and the redundancy version of the third specific content in the second control information are obtained by the base station through division according to the broadcast channel.

According to a fifty-third aspect, a base station includes a broadcasting unit configured to send a broadcast channel to a terminal, where the broadcast channel is not only used for transferring basic physical layer configuration information of a cell, but also used for transferring first specific content agreed between the terminal and the base station, and the first specific content is used for transferring configuration information required by the terminal to access a network.

According to a fifty-fourth aspect, with reference to a possible implementation manner of the fifty-third aspect, a broadband of the cell is divided into multiple narrowbands, and the first specific content includes narrowband configuration information, such that the terminal performs frequency hopping among the multiple narrowbands or in an entire frequency band according to the narrowband configuration information that is parsed out, and selects a narrowband or a frequency range with a good signal to camp on.

According to a fifty-fifth aspect, with reference to a possible implementation manner of the fifty-fourth aspect, the narrowband configuration information includes at least one of information about a narrowband location, information about a quantity of the narrowbands, and information about narrowband composition.

According to a fifty-sixth aspect, with reference to the fifty-fourth aspect or the fifty-fifth aspect, the broadband of the cell or a narrowband obtained through division includes an ePDCCH, and the first specific content further includes ePDCCH configuration information, such that the terminal determines a used ePDCCH according to the ePDCCH configuration information; and listens on the used ePDCCH, and receives a PDSCH according to the ePDCCH.

According to a fifty-seventh aspect, with reference to a possible implementation manner of any aspect of the fifty-third aspect to the fifty-sixth aspect, the first specific content further includes comprehensive system information including some or all content of system information, such that the terminal parses out the comprehensive system information from the first specific content, and acquires system configuration information according to the comprehensive system information.

According to a fifty-eighth aspect, with reference to a possible implementation manner of the fifty-fifth aspect, the first specific content includes first control information, the first control information indicates a manner in which the terminal acquires second specific content, and the second specific content is used for transferring the configuration information required by the terminal to access the network, such that the terminal parses out the first control information from the first specific content; and receives the second specific content in the manner indicated in the first control information.

According to a fifty-ninth aspect, with reference to a possible implementation manner of the fifty-third aspect, a broadband of the cell is divided into multiple narrowbands, and the second specific content includes narrowband configuration information, such that the terminal performs frequency hopping among the multiple narrowbands or in an entire frequency band according to the narrowband configuration information that is parsed out, and selects a narrowband or a frequency range with a good signal to camp on.

According to a sixtieth aspect, with reference to a possible implementation manner of the fifty-seventh aspect, the narrowband configuration information includes at least one of information about a narrowband location, information about a quantity of the narrowbands, and information about narrowband composition.

According to a sixty-first aspect, with reference to a possible implementation manner of the fifty-seventh aspect or fifty-eighth aspect, the broadband of the cell or a narrowband obtained through division includes an ePDCCH, and the second specific content further includes ePDCCH configuration information, such that the terminal determines a used ePDCCH according to the ePDCCH configuration information; and listens on the used ePDCCH, and receives a PDSCH according to the ePDCCH.

According to a sixty-second aspect, with reference to a possible implementation manner of the fifty-eighth aspect or fifty-ninth aspect, the second specific content further includes comprehensive system information including some or all content of system information, such that the terminal parses out, from the second specific content, the comprehensive system information including the some or all content of the system information, and further acquires system configuration information.

According to a sixty-third aspect, with reference to a possible implementation manner of the fifty-sixth aspect, the first control information includes information about a time-frequency resource used by the terminal to receive the second specific content, such that the terminal receives the second specific content using the corresponding time-frequency resource.

According to a sixty-fourth aspect, with reference to a possible implementation manner of the sixty-first aspect, the first control information further includes at least one of a coding scheme and a redundancy version of the second specific content, such that the terminal parses out the second specific content from the broadcast channel according to the coding scheme and the redundancy version in the first control information.

According to a sixty-fifth aspect, with reference to a possible implementation manner of any aspect of the sixtieth aspect to the sixty-second aspect, the second specific content includes second control information, the second control information indicates a manner in which the terminal acquires third specific content, and the third specific content is used for transferring the configuration information required by the terminal to access the network, such that the terminal parses out the second control information from the second specific content; and receives the third specific content in the manner indicated in the second control information.

According to a sixty-sixth aspect, with reference to a possible implementation manner of the sixty-third aspect, the second control information includes information about a time-frequency resource used by the terminal to receive the third specific content, such that the terminal receives the third specific content using the corresponding time-frequency resource.

According to a sixty-seventh aspect, with reference to a possible implementation manner of the sixty-fourth aspect, the second control information further includes at least one of a coding scheme and a redundancy version of the third specific content, such that the terminal parses out the third specific content from the broadcast channel according to the coding scheme and the redundancy version in the second control information.

According to a sixty-eighth aspect, with reference to a possible implementation manner of the sixty-seventh aspect, a broadband of the cell is divided into multiple narrowbands, and the third specific content includes narrowband configuration information, such that the terminal performs frequency hopping among the multiple narrowbands or in an entire frequency band according to the narrowband configuration information that is parsed out, and selects a narrowband or a frequency range with a good signal to camp on.

According to a sixty-ninth aspect, with reference to a possible implementation manner of the sixty-sixth aspect, the narrowband configuration information includes at least one of information about a narrowband location, information about a quantity of the narrowbands, and information about narrowband composition.

According to a seventieth aspect, with reference to a possible implementation manner of either aspect of the sixty-fifth aspect or the sixty-sixth aspect, the broadband of the cell or a narrowband obtained through division includes an ePDCCH, and the third specific content further includes ePDCCH configuration information, such that the terminal determines a used ePDCCH according to the ePDCCH configuration information; and listens on the used ePDCCH, and receives a PDSCH according to the ePDCCH.

According to a seventy-first aspect, with reference to a possible implementation manner of any aspect of the sixty-third aspect to the seventieth aspect, the third specific content further includes comprehensive system information including some or all content of system information, such that the terminal parses out, from the third specific content, the comprehensive system information including the some or all content of the system information, and further acquires the system configuration information.

According to a seventy-second aspect, with reference to a possible implementation manner of any aspect of the sixty-third aspect to the seventy-first aspect, the base station further includes a first setting unit configured to set a reserved bit of the broadcast channel according to the first specific content, the second specific content, and the third specific content, and/or identify the first specific content, the second specific content, and the third specific content using a corresponding bit of the broadcast channel.

According to a seventy-third aspect, with reference to a possible implementation manner of any aspect of the sixty-seventh aspect to the seventy-first aspect, the narrowband configuration information includes information about a narrowband location, and the base station further includes a first dividing unit configured to perform division according to the broadcast channel to obtain the narrowband location; and a second setting unit configured to set a reserved bit of the broadcast channel according to a quantity of the narrowbands, and send the broadcast channel to the broadcasting unit.

According to a seventy-fourth aspect, with reference to a possible implementation manner of any aspect of the sixty-eighth aspect to the seventieth aspect, the ePDCCH configuration information includes information about an ePDCCH location, and the base station further includes a second dividing unit configured to perform division according to the broadcast channel to obtain the ePDCCH location; and a third setting unit configured to set a reserved bit of the broadcast channel according to a quantity of ePDCCHs, and send the broadcast channel to the broadcasting unit.

According to a seventy-fifth aspect, with reference to a possible implementation manner of any aspect of the sixty-second aspect to the sixty-eighth aspect, the first control information includes the time-frequency resource used by the terminal to receive the second specific content, and the base station further includes a third dividing unit configured to perform division according to the broadcast channel to obtain a time-frequency resource used when the specific content is sent to the terminal, and send an indication to a first sending unit; and the first sending unit configured to, after receiving the indication sent by the third dividing unit, send the specific content to the terminal using the time-frequency resource obtained through division.

According to a seventy-sixth aspect, with reference to a possible implementation manner of any aspect of the sixty-second aspect to the sixty-eighth aspect, the second control information includes the time-frequency resource used by the terminal to receive the third specific content, and the base station further includes a fourth dividing unit configured to perform division according to the broadcast channel to obtain a time-frequency resource used when the second specific content is sent to the terminal, and send an indication to a second sending unit; and the second sending unit configured to, after receiving the indication of the fourth dividing unit, send the second specific content to the terminal using the time-frequency resource for transferring the second specific content.

According to a seventy-seventh aspect, with reference to a possible implementation manner of any aspect of the fifty-third aspect to the seventy-sixth aspect, the broadcast channel is a PBCH or an ePBCH.

According to a seventy-eighth aspect, with reference to a possible implementation manner of any aspect of the fifty-third aspect to the seventy-seventh aspect, the coding scheme and the redundancy version of the second specific content in the first control information and/or the coding scheme and the redundancy version of the third specific content in the second control information are obtained by the base station through division according to the broadcast channel.

According to a seventy-ninth aspect, a system for transferring information between a base station and a terminal includes the base station according to any aspect above and the terminal according to any aspect above.

Using the method for transferring information between a base station and a terminal, the base station, the terminal, and the system, the base station can transfer information to the terminal through a broadcast channel, such that manners for transferring information between the base station and the terminal are diversified. Especially, for a terminal that does not support a PDCCH, a base station can still transfer information to the terminal.

BRIEF DESCRIPTION OF DRAWINGS

To describe the technical solutions in the embodiments of the present application more clearly, the following briefly introduces the accompanying drawings required for describing the embodiments. The accompanying drawings in the following description show some embodiments of the present application, and a person of ordinary skill in the art may still derive other drawings from these accompanying drawings without creative efforts.

FIG. 1 is a schematic diagram of dividing a broadband of a system into multiple narrowbands in the background;

FIG. 2 is a flowchart of a method for transferring information between a base station and a terminal according to an embodiment of the present application;

DESCRIPTION OF EMBODIMENTS

Figure 3:
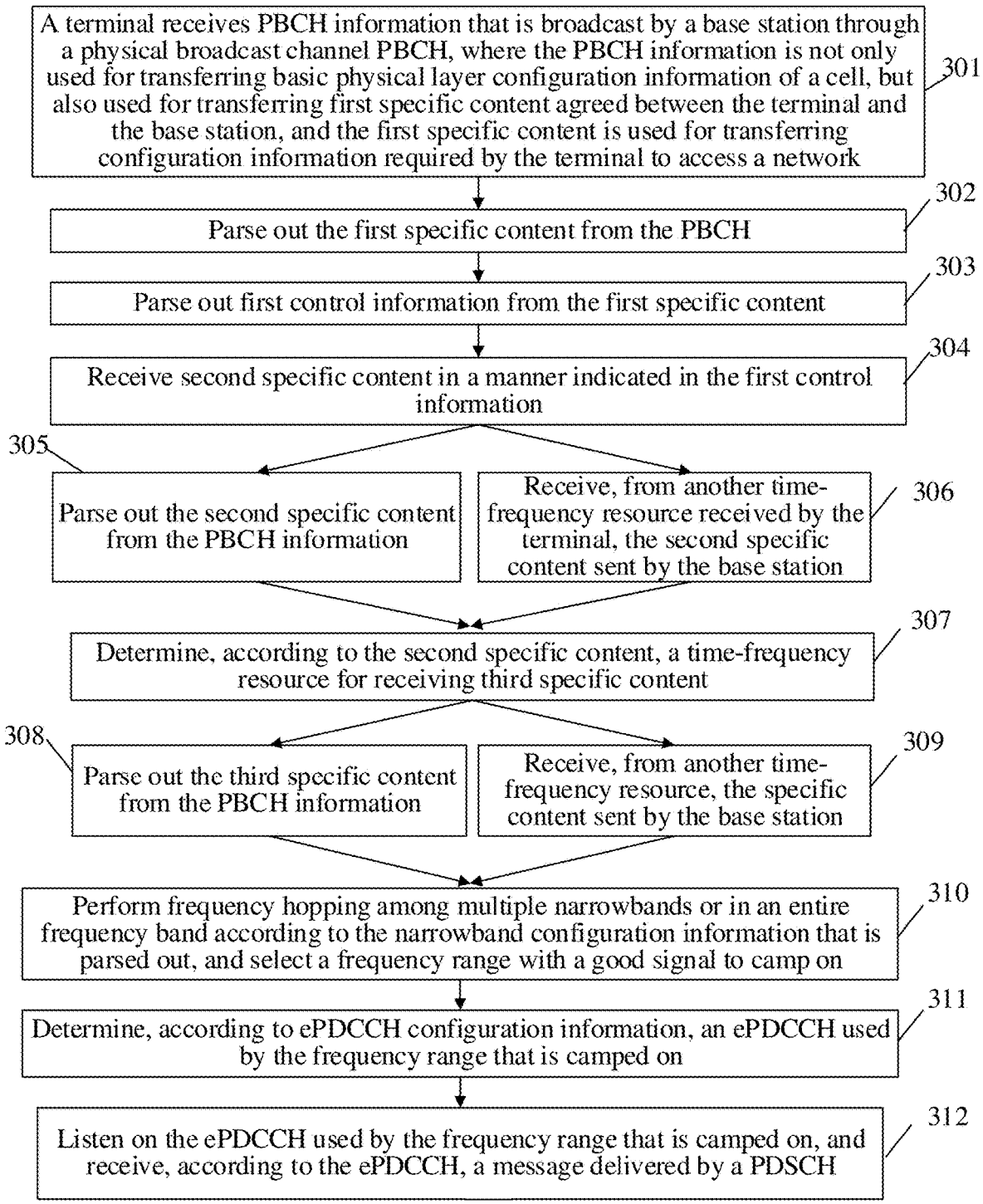
FIG. 3 is a flowchart of another method for transferring information between a base station and a terminal according to an embodiment of the present application.

The following clearly describes the technical solutions in the embodiments of the present application with reference to the accompanying drawings in the embodiments of the present application. The described embodiments are merely some but not all of the embodiments of the present application. All other embodiments obtained by a person of ordinary skill in the art based on the embodiments of the present application without creative efforts shall fall within the protection scope of the present application.

For convenience of description of the technical solutions of the embodiments of the present application, in the embodiments of the present application, words such as "first" and "second" are used to distinguish between same objects or similar objects whose functions and purposes are basically the same.

An embodiment of the present application provides a method for transferring information between a base station and a terminal. As shown in FIG. 2, the method includes the following steps.

201: The terminal receives a broadcast channel, where the broadcast channel is not only used for transferring basic physical layer configuration information of a cell, but also used for transferring first specific content agreed between the terminal and the base station, and the first specific content is used for transferring configuration information required by the terminal to access a network.

In this embodiment of the present application, which type of broadcast channel is used is not limited. For example, the broadcast channel may be a PBCH, or may be an ePBCH. Using a PBCH as an example, PBCH information includes 24-bit binary code. Currently, the base station transfers, to the terminal using the PBCH information, the basic physical layer configuration information of the cell, for example, information such as system bandwidth, PHICH configuration, and high eight bits of an SFN (system frame number, system frame number).

In other approaches, a structure of the PBCH information is shown in Table 1.

TABLE 1

| 3 bits | 3 bits | 8 bits | 10 bits |
|---|---|---|---|
| Downlink bandwidth | PHICH configuration | System frame number | Reserved |

The binary bits in the PBCH information can be used to indicate the foregoing information; besides, the binary bits in the PBCH information may be reinterpreted, or a reserved bit may be set, such that the binary bits in the PBCH information can be further used to indicate other specific content, where the specific content may be any required content agreed between the base station and the terminal, for example, may be ePDCCH configuration information, narrowband configuration information, or comprehensive system information, or may be information for scheduling the foregoing information.

202: Parse out the first specific content from the broadcast channel.

According to the method for transferring information between a base station and a terminal provided in this embodiment, the base station can transfer information to the terminal through a broadcast channel, such that manners for transferring information between the base station and the terminal are diversified. Especially, for a terminal that does not support a PDCCH, a base station can still transfer information to the terminal.

As an improvement of the foregoing embodiment, an embodiment of the present application provides another method for transferring information between a base station and a terminal. Detailed description is provided below by assuming that a base station transfers, to a terminal through a PBCH, information except conventional information. As shown in FIG. 3, the method includes the following steps.

301: The terminal receives PBCH information that is broadcast by the base station through a PBCH, where the PBCH information is not only used for transferring basic physical layer configuration information of a cell, but also used for transferring first specific content agreed between the terminal and the base station, and the first specific content is used for transferring configuration information required by the terminal to access a network.

302: The terminal parses out the first specific content from the PBCH.

For information in the first specific content, there may be the following two cases, and the terminal executes different operations according to different information in the first specific content.

Case 1:

The first specific content includes at least one of narrowband configuration information, ePDCCH configuration information, and system configuration information. In this case, there are the following four execution manners for the terminal.

The first one is that, a broadband of the cell is divided into multiple narrowbands, the first specific content includes narrowband configuration information, and the terminal parses out the narrowband configuration information from the PBCH information. The process ends after step 310 is performed.

Content executed on a base station side is that, the narrowband configuration information includes at least one of information about a narrowband location, information about a quantity of the narrowbands, and information about narrowband composition, and the narrowband location is obtained by the base station through division according to the PBCH information. In an embodiment, while the base station constructs the PBCH information, as shown in Table 2, the base station performs division according to the constructed PBCH information to obtain a corresponding frequency resource as the narrowband location, and sets a reserved bit of the PBCH information according to a quantity of the narrowband resources and an interval between the narrowband resources, or as shown in Table 2, the base station indicates a quantity of the narrowband resources and an interval between the narrowband resources using a corresponding bit in non-reserved bits of the PBCH information.

TABLE 2

| 9 bits | 10 bits | 5 bits |
|---|---|---|
| Start position of an MTC narrowband | Reserved | Quantity of MTC narrowbands |

The second one is that, a broadband of the cell includes an ePDCCH, the first specific content includes ePDCCH configuration information, and the terminal parses out the ePDCCH configuration information from the PBCH information, and performs step 311 and a subsequent step.

Content executed on a base station side is that, the ePDCCH configuration information includes information about an ePDCCH location, and the ePDCCH location is obtained by the base station through division according to the PBCH information. In an embodiment, while the base station constructs the PBCH information, as shown in Table 3, the base station performs division according to the constructed PBCH information to obtain a corresponding frequency resource as the ePDCCH location, and sets a reserved bit of the PBCH information according to a quantity of ePDCCHs, or as shown in Table 3, the base station indicates a quantity of ePDCCHs using a corresponding bit in non-reserved bits of the PBCH information.

TABLE 3

| 5 bits | 16 bits | 3 bits |
|---|---|---|
| Initial location of an ePDCCH | Reserved | Initial bandwidth of the ePDCCH |

The third one is that, a broadband of the cell is divided into multiple narrowbands, and the first specific content includes narrowband configuration information, and in addition, the broadband of the cell further includes an ePDCCH, and the specific content further includes ePDCCH configuration information; then the terminal parses out the narrowband configuration information and the ePDCCH configuration information from the PBCH information, and performs step 309 and a subsequent step.

The fourth one is that, based on the foregoing three cases, the first specific content further includes comprehensive system information including some or all content of system information, and the comprehensive system information including the some or all content of the system information is parsed out from the PBCH information. System configuration information is acquired according to the comprehensive system information. A manner for indicating the comprehensive system information in the PBCH information is the same as those shown in Table 2 and Table 3, and is not described herein again.

Case 2:

The first specific content includes first control information, the first control information indicates a manner in which the terminal acquires second specific content, and the second specific content is used for transferring the configuration information required by the terminal to access the network.

Step 302 may include the following steps.

3021: The terminal determines whether the first specific content is required.

3022: If the first specific content is required, the terminal parses out the first specific content from the PBCH information.

In this embodiment of the present application, the following two manners may be used to indicate the first specific content using the PBCH information.

The first one is that, the first specific content is indicated using a reserved bit in 24-bit binary code identifying the PBCH information.

As the first specific content is indicated using the reserved bit, the reserved bit may be changed as required without imposing any impact on original content of the PBCH information, having great flexibility.

The second one is that, the first specific content is indicated using a non-reserved bit in 24-bit binary code identifying the PBCH information.

As the first specific content is indicated using the non-reserved bit, the PBCH information does not need to be modified, which reduces operation content performed on a base station side, and reduces work of the base station.

303: The terminal parses out first control information from the first specific content.

304: The terminal receives second specific content in a manner indicated in the first control information.

To diversify information transfer ways, make information transfer more flexible, and use a frequency resource more efficiently, and for the sake of information security, the first control information may include information about a time-frequency resource used by the base station to send the second specific content to the terminal; and may further include information about a modulation and coding scheme and a redundancy version of the second specific content, and the like.

The base station constructs the PBCH information in the first or second manner, such that the PBCH information can transfer the agreed second specific content to the terminal.

If the base station constructs the PBCH information in the first manner, the base station performs division according to the constructed PBCH information to obtain a corresponding frequency resource for transferring the first specific content, and selects a modulation and coding scheme and a redundancy version of the first specific content according to a corresponding bit of the PBCH information.

If the base station constructs the PBCH information in the second manner, the base station performs division according to the constructed PBCH information to obtain a corresponding frequency resource for transferring the first specific content, and selects a corresponding bit of the PBCH information according to a modulation and coding scheme and a redundancy version of the first specific content.

Content executed on the base station side is that, the first specific content includes the information about the time-frequency resource for transferring the second specific content, and the time-frequency resource for transferring the second specific content is obtained by the base station through division according to the PBCH information. In an embodiment, while the base station constructs the PBCH information, as shown in Table 4, the base station performs division according to the constructed PBCH information to obtain a corresponding frequency resource as a resource for transferring the second specific content, and sets a reserved bit of the PBCH information according to the modulation and coding scheme and the redundancy version of the second specific content, or as shown in Table 4, the base station indicates the modulation and coding scheme and the redundancy version of the second specific content using a corresponding bit in non-reserved bits of the PBCH information.

TABLE 4

| 9 bits | 10 bits | 5 bits |
|---|---|---|
| Location of a resource for scheduling information of configuration information | Reserved | Modulation and coding scheme and redundancy version |

The terminal determines, according to the first specific content, a time-frequency resource for receiving the second specific content.

After determining that the time-frequency resource for receiving the second specific content is a PBCH, the terminal performs step 305. After determining that the time-frequency resource for receiving the second specific content is another time-frequency resource, the terminal performs step 306.

The time-frequency resource used by the terminal to receive the second specific content may be agreed with the base station in advance, or may be transferred by the base station to the terminal using the first specific content as described in this embodiment. If the manner in which the time-frequency resource is agreed in advance is used, step 304 may be omitted, and steps 305 and 306 may be changed to that the terminal directly receives the second specific content from the agreed time-frequency resource.

Content executed on the base station side is that, the second specific content includes information about a time-frequency resource for transferring specific content, and the time-frequency resource for transferring the specific content is obtained by the base station through division according to the PBCH information. In an embodiment, while the base station constructs the PBCH information, as shown in Table 5, the base station performs division according to the constructed PBCH information to obtain a corresponding frequency resource as a resource for transferring the specific content, and sets a reserved bit of the PBCH information according to a modulation and coding scheme and a redundancy version of the specific content, or as shown in Table 5, the base station indicates a modulation and coding scheme and a redundancy version of the specific content using a corresponding bit in non-reserved bits of the PBCH information.

TABLE 5

| 9 bits | 10 bits | 5 bits |
|---|---|---|
| Location of a resource for configuration information | Reserved | Modulation and coding scheme and redundancy version |

305: The terminal parses out the second specific content from the PBCH information.

To diversify information transfer ways, make information transfer more flexible, and use a frequency resource more efficiently, and for the sake of information security, the second specific content may include information about a time-frequency resource used by the base station to send the specific content to the terminal; and may further include information about a modulation and coding scheme and a redundancy version of the specific content, and the like.

In an embodiment, step 305 may include the following.

1: The terminal determines whether the second specific content is required.

3: If the second specific content is required, the terminal parses out the second specific content from the PBCH information.

306: The terminal receives, from another time-frequency resource received by the terminal, the second specific content sent by the base station.

In steps 305 and 306, the terminal may agree with the base station in advance about information such as the modulation and coding scheme and the redundancy version of the second specific content, and the base station may also transfer information such as the modulation and coding scheme and the redundancy version of the second specific content to the terminal using the first specific content. If the former manner is used, the terminal may directly parse out the second specific content from the PBCH information in a manner agreed in advance. If the latter manner is used, the terminal parses out the second specific content from the PBCH information in a setting manner, transferred in the first specific content, of the second specific content, and acquires the information, in the second specific content, about the time-frequency resource used by the base station to send the specific content to the terminal, information about the modulation and coding scheme and the redundancy version of the specific content, and the like.

For information in the second specific content, there may be the following two cases, and the terminal executes different operations according to different information in the second specific content.

Case 1:

The second specific content includes at least one of narrowband configuration information, ePDCCH configuration information, and system configuration information. In this case, there are the following four execution manners for the terminal.

The first one is that, a broadband of the cell is divided into multiple narrowbands, the second specific content includes narrowband configuration information, and the terminal parses out the narrowband configuration information from the PBCH information. The process ends after step 310 is performed.

Content executed on the base station side is that, the narrowband configuration information includes at least one of information about a narrowband location, information about a quantity of the narrowbands, and information about narrowband composition, and the narrowband location is obtained by the base station through division according to the PBCH information. In an embodiment, while the base station constructs the PBCH information, as shown in Table 2, the base station performs division according to the constructed PBCH information to obtain a corresponding frequency resource as the narrowband location, and sets a reserved bit of the PBCH information according to a quantity of the narrowband resources and an interval between the narrowband resources, or as shown in Table 2, the base station indicates a quantity of the narrowband resources and an interval between the narrowband resources using a corresponding bit in non-reserved bits of the PBCH information.

The second one is that, a broadband of the cell includes an ePDCCH, the second specific content includes ePDCCH configuration information, and the terminal parses out the ePDCCH configuration information from the PBCH information, and performs step 311 and a subsequent process.

Content executed on the base station side is that, the ePDCCH configuration information includes information about an ePDCCH location, and the ePDCCH location is obtained by the base station through division according to the PBCH information. In an embodiment, while the base station constructs the PBCH information, as shown in Table 3, the base station performs division according to the constructed PBCH information to obtain a corresponding frequency resource as the ePDCCH location, and sets a reserved bit of the PBCH information according to a quantity of ePDCCHs, or as shown in Table 3, the base station indicates a quantity of ePDCCHs using a corresponding bit in non-reserved bits of the PBCH information.

The third one is that, a broadband of the cell is divided into multiple narrowbands, and the second specific content includes narrowband configuration information, and in addition, the broadband of the cell further includes an ePDCCH, and the second specific content further includes ePDCCH configuration information; then the terminal parses out the narrowband configuration information and the ePDCCH configuration information from the PBCH information, and performs step 310 and a subsequent process.

The fourth one is that, based on the foregoing three cases, the second specific content further includes comprehensive system information including some or all content of system information, and the terminal parses out, from the PBCH information, the comprehensive system information including the some or all content of the system information. System configuration is acquired according to the comprehensive system information. A manner for indicating the comprehensive system information in the PBCH information is the same as those shown in Table 2 and Table 3, and is not described herein again.

Case 2:

The second specific content includes the first control information, the first control information indicates a manner in which the terminal acquires the second specific content, and the second specific content is used for transferring the configuration information required by the terminal to access the network. The terminal performs step 307 and a subsequent process.

In this embodiment of the present application, a specific manner for indicating the second specific content in the PBCH information is the same as that of the first specific content, and is not described herein again.

307: Determine, according to the second specific content, a time-frequency resource for receiving third specific content.

When determining that the time-frequency resource for receiving the third specific content is a PBCH, the terminal performs step 308. When determining that the time-frequency resource for receiving the third specific content is another time-frequency resource, the terminal performs step 309.

The time-frequency resource used by the terminal to receive the third specific content may be agreed with the base station in advance, or may be transferred by the base station to the terminal using the second specific content as described in this embodiment. If the manner in which the time-frequency resource is agreed in advance is used, step 306 may be omitted, and steps 308 and 309 may be changed to that the terminal directly receives, from the time-frequency resource agreed in advance, the third specific content sent by the base station.

308: The terminal parses out the third specific content from the PBCH information.

In an embodiment, step 308 may include the following.

1: The terminal determines whether the third specific content is required.

3: If the third specific content is required, the terminal parses out the third specific content from the PBCH information.

309: The terminal receives, from another time-frequency resource, the specific content sent by the base station.

In steps 308 and 309, the terminal may agree with the base station in advance about a coding scheme and a redundancy version of the third specific content, or the base station may transfer a coding scheme and a redundancy version of the third specific content to the terminal using the second specific content. If the former manner is used, the terminal may directly parse out the third specific content from the PBCH information in a manner agreed in advance. If the latter manner is used, the terminal parses out the third specific content from the PBCH information according to the coding scheme and the redundancy version of the third specific content that are transferred in the second specific content.

For steps 308 and 309, In an embodiment, there are the following four cases.

The first one is that, a broadband of the cell is divided into multiple narrowbands, the third specific content includes narrowband configuration information, and the terminal parses out the narrowband configuration information from the PBCH information. The process ends after step 310 is performed.

Content executed on the base station side is that, the narrowband configuration information includes at least one of information about a narrowband location, information about a quantity of the narrowbands, and information about narrowband composition, and the narrowband location is obtained by the base station through division according to the PBCH information. In an embodiment, while the base station constructs the PBCH information, as shown in Table 2, the base station performs division according to the constructed PBCH information to obtain a corresponding frequency resource as the narrowband location, and sets a reserved bit of the PBCH information according to a quantity of the narrowband resources and an interval between the narrowband resources, or as shown in Table 2, the base station indicates a quantity of the narrowband resources and an interval between the narrowband resources using a corresponding bit in non-reserved bits of the PBCH information.

The second one is that, a broadband of the cell includes an ePDCCH, the third specific content includes ePDCCH configuration information, and the terminal parses out the ePDCCH configuration information from the PBCH information, and performs step 311 and a subsequent process.

Content executed on the base station side is that, the ePDCCH configuration information includes information about an ePDCCH location, and the ePDCCH location is obtained by the base station through division according to the PBCH information. In an embodiment, while the base station constructs the PBCH information, as shown in Table 3, the base station performs division according to the constructed PBCH information to obtain a corresponding frequency resource as the ePDCCH location, and sets a reserved bit of the PBCH information according to a quantity of ePDCCHs, or as shown in Table 3, the base station indicates a quantity of ePDCCHs using a corresponding bit in non-reserved bits of the PBCH information.

The third one is that, a broadband of the cell is divided into multiple narrowbands, and the third specific content includes narrowband configuration information, and in addition, the broadband of the cell further includes an ePDCCH, and the third specific content further includes ePDCCH configuration information; then the terminal parses out the narrowband configuration information and the ePDCCH configuration information from the PBCH information, and performs step 310 and a subsequent process.

The fourth one is that, based on the foregoing three cases, the third specific content further includes comprehensive system information including some or all content of system information, and the terminal parses out, from the PBCH information, the comprehensive system information including the some or all content of the system information. System configuration is acquired according to the comprehensive system information.

In this embodiment of the present application, a specific manner for indicating the third specific content in the PBCH information is the same as those of the first specific content and the second specific content, and is not described herein again.

310: The terminal performs frequency hopping among multiple narrowbands or in an entire frequency band according to the narrowband configuration information that is parsed out, and selects a frequency range with a good signal to camp on.

311: The terminal determines, according to ePDCCH configuration information, an ePDCCH used by the frequency range that is camped on.

312: The terminal listens on the ePDCCH used by the frequency range that is camped on, and receives, according to the ePDCCH, a message delivered by a PDSCH.

In the embodiment corresponding to FIG. 3, steps 301, 308, 309, and 310, steps 301, 308, 309, 311, and 312, and steps 301, 308, 309, 310, 311, and 312 may separately form one independent technical solution, and a specific implementation manner of the independent technical solution is the same as the implementation manner in the embodiment corresponding to FIG. 3, and is not described herein again. Moreover, an order between step 310 and steps 311 and 312 is not fixed, and may be adjusted as required during specific implementation.

According to the method for transferring information between a base station and a terminal in an LTE system provided in this embodiment, the base station can transfer information to the terminal using PBCH information that is broadcast, such that manners for transferring information between the base station and the terminal are diversified. Especially, for a terminal that does not support a PDCCH, a base station can still transfer information to the terminal.

Figure 4:
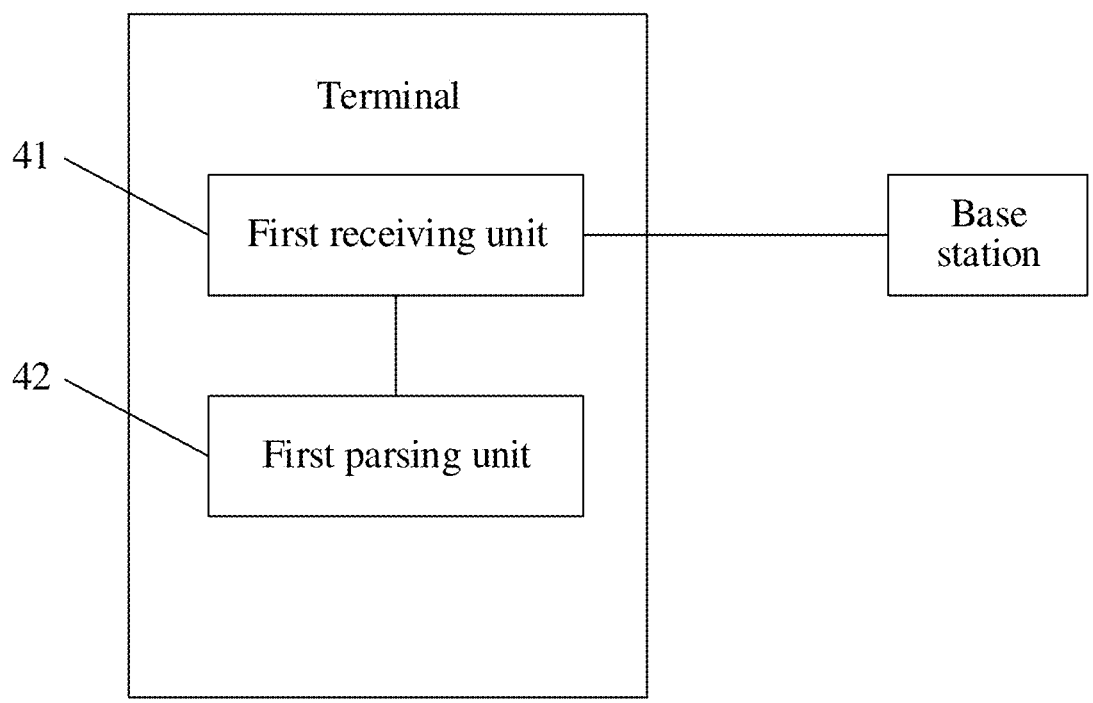
FIG. 4 is a schematic structural diagram of a terminal according to an embodiment of the present application.

To cooperate to implement the method in the foregoing embodiment, an embodiment of the present application provides a terminal. As shown in FIG. 4, the terminal includes a first receiving unit 41 configured to receive a broadcast channel, and send the received broadcast channel to a first parsing unit 42, where the broadcast channel is not only used for transferring basic physical layer configuration information of a cell, but also used for transferring first specific content agreed between the terminal and a base station, and the first specific content is used for transferring configuration information required by the terminal to access a network, where in this embodiment of the present application, which type of broadcast channel is used is not limited; for example, the broadcast channel may be a PBCH, or may be an ePBCH; and the first parsing unit 42 configured to receive the broadcast channel sent by the first receiving unit 41, and parse out the first specific content from the broadcast channel.

According to the terminal provided in this embodiment, a first receiving unit receives a broadcast channel, and a first parsing unit parses out first specific content from the broadcast channel, where the first specific content is used for transferring configuration information required by the terminal to access a network, such that manners for transferring information between a base station and the terminal are diversified. Especially, for a terminal that does not support a PDCCH, a base station can still transfer information to the terminal.

Figure 5:
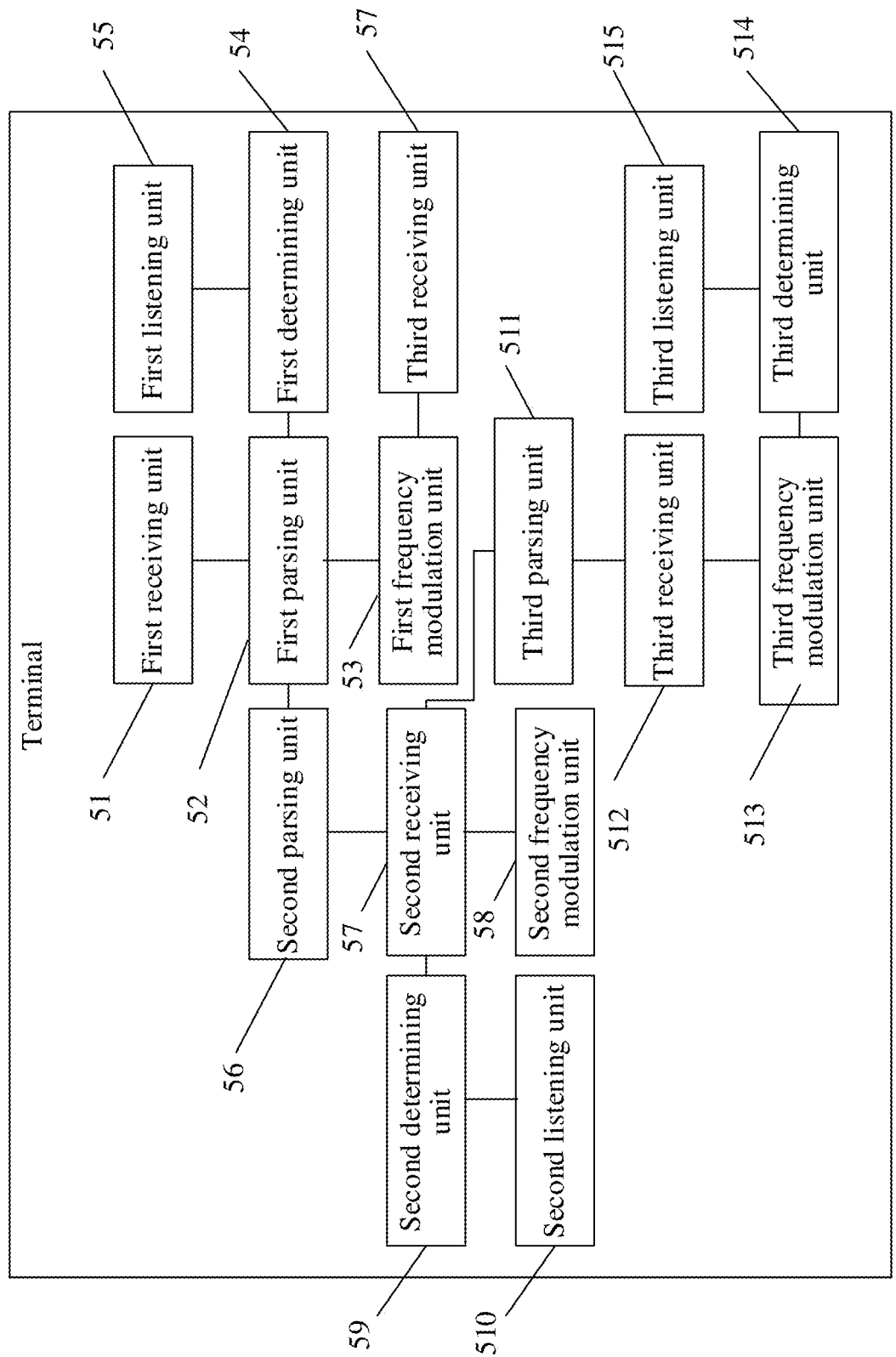
FIG. 5 is a schematic structural diagram of another terminal according to an embodiment of the present application.

As an improvement of the embodiment corresponding to FIG. 4, an embodiment of the present application provides another terminal. In this embodiment, a broadcast channel is a PBCH. As shown in FIG. 5, the terminal includes a first receiving unit 51 configured to receive a broadcast channel, and send the received broadcast channel to a first parsing unit 52, where the broadcast channel is not only used for transferring basic physical layer configuration information of a cell, but also used for transferring first specific content agreed between the terminal and a base station, and the first specific content is used for transferring configuration information required by the terminal to access a network; and the first parsing unit 52 configured to receive the broadcast channel sent by the first receiving unit, and parse out the first specific content from the broadcast channel.

Optionally, a broadband of the cell is divided into multiple narrowbands, and the first specific content includes narrowband configuration information, and the first parsing unit 52 includes a first parsing subunit 521 configured to parse out the narrowband configuration information from the first specific content, and the terminal further includes a first frequency modulation unit 53 configured to perform frequency hopping among the multiple narrowbands or in an entire frequency band according to the narrowband configuration information that is parsed out, and select a narrowband or a frequency range with a good signal to camp on.

Optionally, the narrowband configuration information includes at least one of information about a narrowband location, information about a quantity of the narrowbands, and information about narrowband composition.

Optionally, the broadband of the cell or a narrowband obtained through division includes an ePDCCH, and the first specific content further includes ePDCCH configuration information, and the first parsing unit 52 further includes a second parsing subunit 522 configured to parse out the ePDCCH configuration information from the broadcast channel, and the terminal further includes a first determining unit 54 configured to determine a used ePDCCH according to the ePDCCH configuration information; and a first listening unit 55 configured to listen on the used ePDCCH, and receive a PDSCH according to the ePDCCH.

Optionally, the first specific content further includes comprehensive system information including some or all content of system information, and the first parsing unit 52 further includes a third parsing subunit 523 configured to parse out the comprehensive system information from the first specific content, and the terminal includes a first acquiring unit configured to acquire system configuration information according to the comprehensive system information.

Optionally, the first specific content includes first control information, the first control information indicates a manner in which the terminal acquires second specific content, and the terminal further includes a second parsing unit 56 configured to receive the first specific content sent by the first parsing unit, parse out the first control information from the first specific content, and send the first control information that is parsed out to a second receiving unit; and the second receiving unit 57 configured to receive the first control information sent by the second parsing unit, and receive the second specific content in the manner indicated in the first control information.

To diversify information transfer ways, make information transfer more flexible, and use a frequency resource more efficiently, and for the sake of information security, in this embodiment, the first control information may include information about a time-frequency resource used by the base station to send the second specific content to the terminal; and may further include information about a modulation and coding scheme and a redundancy version of the second specific content, and the like.

Optionally, a broadband of the cell is divided into multiple narrowbands, and the second specific content includes narrowband configuration information, and the second receiving unit 57 includes a fourth parsing subunit 571 configured to parse out the narrowband configuration information from the second specific content, and the terminal further includes a second frequency modulation unit 58 configured to perform frequency hopping among the multiple narrowbands or in an entire frequency band according to the narrowband configuration information that is parsed out, and select a narrowband or a frequency range with a good signal to camp on.

Optionally, the narrowband configuration information includes at least one of information about a narrowband location, information about a quantity of the narrowbands, and information about narrowband composition.

Optionally, the broadband of the cell or a narrowband obtained through division includes an ePDCCH, and the second specific content further includes ePDCCH configuration information, the second receiving unit 57 further includes a fifth parsing subunit 572 configured to parse out the ePDCCH configuration information from the broadcast channel, and the terminal further includes a second determining unit 59 configured to determine a used ePDCCH according to the ePDCCH configuration information; and a second listening unit 510 configured to listen on the used ePDCCH, and receive a PDSCH according to the ePDCCH.

Optionally, the second specific content further includes comprehensive system information including some or all content of system information, and the second receiving unit 57 further includes a sixth parsing subunit 573 configured to parse out, from the second specific content, the comprehensive system information including the some or all content of the system information; and a second acquiring subunit configured to acquire system configuration information according to the comprehensive system information.

Optionally, the first control information includes information about a time-frequency resource used by the terminal to receive the second specific content, and the second receiving unit 57 includes a first receiving subunit 574 configured to, when the time-frequency resource for receiving the second specific content is a broadcast channel, parse out the second specific content from the broadcast channel; and a second receiving subunit 575 configured to, when the time-frequency resource for receiving the second specific content is another time-frequency resource, receive, from the other time-frequency resource, the second specific content sent by the base station.

Optionally, the second specific content further includes system configuration information, and the second receiving unit 57 further includes a sixth parsing subunit 576 configured to parse out the system configuration information from the second specific content.

Optionally, the first control information further includes at least one of a coding scheme and a redundancy version of the second specific content, and the parsing out, by the first receiving subunit 574, the second specific content from the broadcast channel is parsing out, by the first receiving subunit 574, the second specific content from the broadcast channel according to the coding scheme and the redundancy version in the first control information.

Optionally, the second specific content includes second control information, the second control information indicates a manner in which the terminal acquires third specific content, and the terminal further includes a third parsing unit 511 configured to receive the second specific content sent by the second receiving unit, parse out the second control information from the second specific content, and send the second control information that is parsed out to a third receiving unit; and the third receiving unit 512 configured to receive the second control information sent by the third parsing unit, and receive the third specific content in the manner indicated in the second control information.

To diversify information transfer ways, make information transfer more flexible, and use a frequency resource more efficiently, and for the sake of information security, in this embodiment, the second control information may include information about a time-frequency resource used by the base station to send the third specific content to the terminal; and may further include information about a modulation and coding scheme and a redundancy version of the second specific content, and the like.

Optionally, the second control information includes information about a time-frequency resource used by the terminal to receive the third specific content, and the third receiving unit 512 includes a third receiving subunit 5121 configured to, when the time-frequency resource for receiving the third specific content is a broadcast channel, parse out the third specific content from the broadcast channel; and a fourth receiving subunit 5122 configured to, when the time-frequency resource for receiving the third specific content is another time-frequency resource, receive, from the other time-frequency resource, the third specific content sent by the base station.

Optionally, the second control information further includes at least one of a coding scheme and a redundancy version of the third specific content, and the parsing out, by the third receiving subunit 5121, the third specific content from the broadcast channel is parsing out, by the third receiving subunit 5121, the third specific content from the broadcast channel according to the coding scheme and the redundancy version in the second control information.

Optionally, a broadband of the cell is divided into multiple narrowbands, and the third specific content includes narrowband configuration information, and the terminal further includes a third frequency modulation unit 513 configured to perform frequency hopping among the multiple narrowbands or in an entire frequency band according to the narrowband configuration information that is parsed out, and select a narrowband or a frequency range with a good signal to camp on.

Optionally, the narrowband configuration information includes at least one of information about a narrowband location, information about a quantity of the narrowbands, and information about narrowband composition.

Optionally, the broadband of the cell or a narrowband obtained through division includes an ePDCCH, the third specific content further includes ePDCCH configuration information, the parsing out, by the third receiving subunit 5121, the third specific content from the broadcast channel further includes parsing out, by the third receiving subunit 5121, the ePDCCH configuration information from the broadcast channel, and the terminal further includes a third determining unit 514 configured to determine a used ePDCCH according to the ePDCCH configuration information, and send information about the determined used ePDCCH to a listening unit; and a third listening unit 515 configured to receive the ePDCCH information sent by the determining unit, listen on the used ePDCCH, and receive a PDSCH according to the ePDCCH.

Optionally, the third specific content further includes comprehensive system information including some or all content of system information, and the third receiving unit 512 further includes a seventh parsing subunit configured to parse out the system configuration information from the third specific content; and a third acquiring subunit configured to acquire system configuration information according to the comprehensive system information.

Optionally, the first specific content, the second specific content, and the third specific content are indicated using a reserved bit in binary code identifying the broadcast channel.

Optionally, the narrowband configuration information includes information about a narrowband location, and the narrowband location is obtained by the base station through division according to the broadcast channel.

Optionally, the ePDCCH configuration information includes information about an ePDCCH location, and the ePDCCH location is obtained by the base station through division according to the broadcast channel.

Optionally, the time-frequency resource in the first control information and used by the terminal to receive the second specific content and/or the time-frequency resource in the second control information and used by the terminal to receive the third specific content is obtained by the base station through division according to the broadcast channel.

Figure 6:
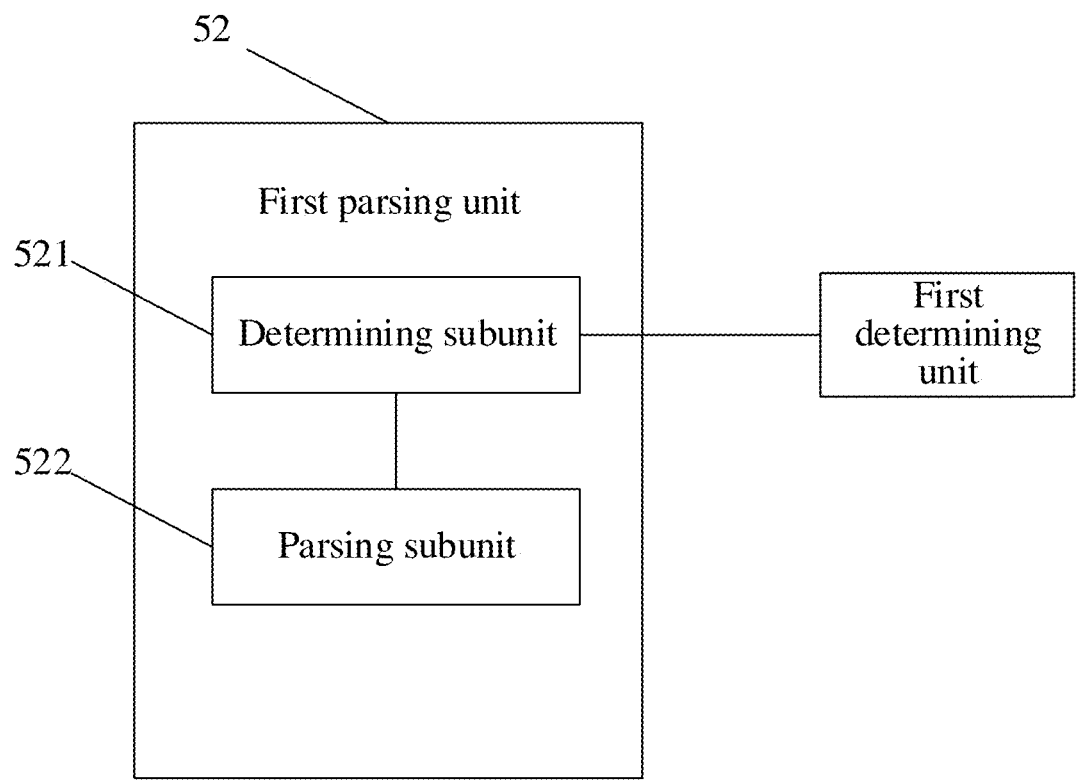
FIG. 6 is a schematic structural diagram of a first parsing unit of the terminal shown in FIG. 5.

Optionally, as shown in FIG. 6, the first parsing unit 52 includes a determining subunit 521 configured to determine whether the first specific content is required, and if the first specific content is required, send an indication to a parsing subunit; and the parsing subunit 522 configured to, after receiving the indication sent by the determining subunit, parse out the first specific content from the broadcast channel.

Optionally, the broadcast channel is a PBCH or an ePBCH.

Optionally, the coding scheme and the redundancy version of the second specific content in the first control information and/or the coding scheme and the redundancy version of the third specific content in the second control information are obtained by the base station through division according to the broadcast channel.

According to the terminal provided in this embodiment, a first receiving unit receives a PBCH, and a first parsing unit parses out first specific content from the PBCH, where the first specific content is used for transferring configuration information required by the terminal to access a network, such that manners for transferring information between a base station and the terminal are diversified. Especially, for a terminal that does not support a PDCCH, a base station can still transfer information to the terminal.

Figure 7:
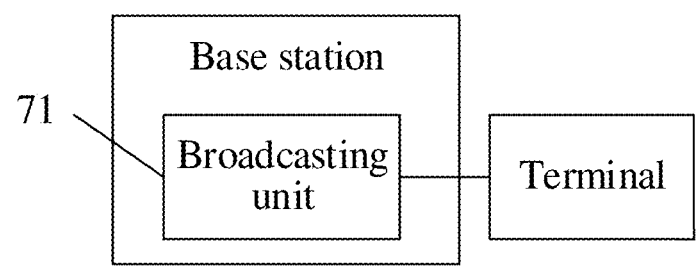
FIG. 7 is a schematic structural diagram of a base station according to an embodiment of the present application.

To cooperate to implement the foregoing method, an embodiment of the present application provides a base station. As shown in FIG. 7, the base station includes a broadcasting unit 71 configured to send a broadcast channel to a terminal, where the broadcast channel is not only used for transferring basic physical layer configuration information of a cell, but also used for transferring first specific content agreed between the terminal and the base station, and the first specific content is used for transferring configuration information required by the terminal to access a network.

According to the base station provided in this embodiment, a broadcasting unit sends a broadcast channel to a terminal, where the broadcast channel is not only used for transferring basic physical layer configuration information of a cell, but also used for transferring first specific content agreed between the terminal and the base station, and the first specific content is used for transferring configuration information required by the terminal to access a network, such that manners for transferring information between the base station and the terminal are diversified. Especially, for a terminal that does not support a PDCCH, a base station can still transfer information to the terminal.

Figure 8:
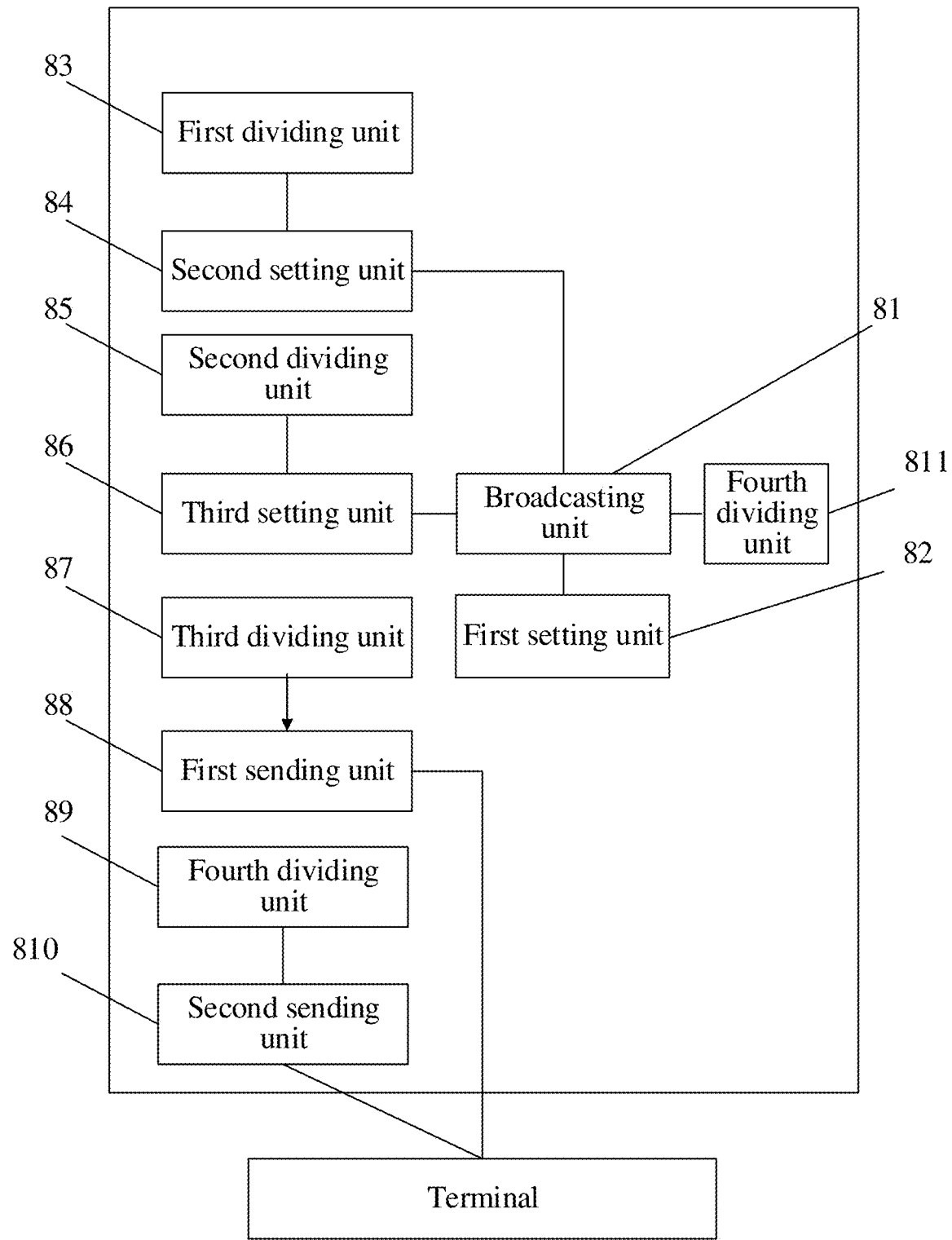
FIG. 8 is a schematic structural diagram of another base station according to an embodiment of the present application.

As an improvement of the embodiment corresponding to FIG. 7, an embodiment of the present application provides another base station. In this embodiment, a broadcast channel is a physical broadcast channel. As shown in FIG. 8, the base station includes a broadcasting unit 81 configured to send a broadcast channel to a terminal, where the broadcast channel is not only used for transferring basic physical layer configuration information of a cell, but also used for transferring first specific content agreed between the terminal and the base station, and the first specific content is used for transferring configuration information required by the terminal to access a network.

Optionally, a broadband of the cell is divided into multiple narrowbands, and the first specific content includes narrowband configuration information, such that the terminal performs frequency hopping among the multiple narrowbands or in an entire frequency band according to the narrowband configuration information that is parsed out, and selects a narrowband or a frequency range with a good signal to camp on.

Optionally, the narrowband configuration information includes at least one of information about a narrowband location, information about a quantity of the narrowbands, and information about narrowband composition.

Optionally, the broadband of the cell or a narrowband obtained through division includes an ePDCCH, and the first specific content further includes ePDCCH configuration information, such that the terminal determines a used ePDCCH according to the ePDCCH configuration information; and listens on the used ePDCCH, and receives a PDSCH according to the ePDCCH.

Optionally, the first specific content further includes comprehensive system information including some or all content of system information, such that the terminal parses out, from the first specific content, the comprehensive system information including the some or all content of the system information, and further acquires the system configuration information.

Optionally, the first specific content includes first control information, the first control information indicates a manner in which the terminal acquires second specific content, and the second specific content is used for transferring the configuration information required by the terminal to access the network, such that the terminal parses out the first control information from the first specific content; and receives the second specific content in the manner indicated in the first control information.

Optionally, a broadband of the cell is divided into multiple narrowbands, and the second specific content includes narrowband configuration information, such that the terminal performs frequency hopping among the multiple narrowbands or in an entire frequency band according to the narrowband configuration information that is parsed out, and selects a narrowband or a frequency range with a good signal to camp on.

Optionally, the narrowband configuration information includes at least one of information about a narrowband location, information about a quantity of the narrowbands, and information about narrowband composition.

Optionally, the broadband of the cell or a narrowband obtained through division includes an ePDCCH, and the second specific content further includes ePDCCH configuration information, such that the terminal determines a used ePDCCH according to the ePDCCH configuration information; and listens on the used ePDCCH, and receives a PDSCH according to the ePDCCH.

Optionally, the second specific content further includes comprehensive system information including some or all content of system information, such that the terminal parses out, from the second specific content, the comprehensive system information including the some or all content of the system information, and further acquires the system configuration information.

Optionally, the first control information includes information about a time-frequency resource used by the terminal to receive the second specific content, such that the terminal receives the second specific content using the corresponding time-frequency resource.

Optionally, the first control information further includes at least one of a coding scheme and a redundancy version of the second specific content, such that the terminal parses out the second specific content from the broadcast channel according to the coding scheme and the redundancy version in the first control information.

Optionally, the second specific content includes second control information, the second control information indicates a manner in which the terminal acquires third specific content, and the third specific content is used for transferring the configuration information required by the terminal to access the network, such that the terminal parses out the second control information from the second specific content; and receives the third specific content in the manner indicated in the second control information.

Optionally, the second control information includes information about a time-frequency resource used by the terminal to receive the third specific content, such that the terminal receives the third specific content using the corresponding time-frequency resource.

Optionally, the second control information further includes at least one of a coding scheme and a redundancy version of the third specific content, such that the terminal parses out the third specific content from the broadcast channel according to the coding scheme and the redundancy version in the second control information.

Optionally, a broadband of the cell is divided into multiple narrowbands, and the third specific content includes narrowband configuration information, such that the terminal performs frequency hopping among the multiple narrowbands or in an entire frequency band according to the narrowband configuration information that is parsed out, and selects a narrowband or a frequency range with a good signal to camp on.

Optionally, the narrowband configuration information includes at least one of information about a narrowband location, information about a quantity of the narrowbands, and information about narrowband composition.

Optionally, the broadband of the cell or a narrowband obtained through division includes an ePDCCH, and the third specific content further includes ePDCCH configuration information, such that the terminal determines a used ePDCCH according to the ePDCCH configuration information; and listens on the used ePDCCH, and receives a PDSCH according to the ePDCCH.

Optionally, the third specific content further includes comprehensive system information including some or all content of system information, such that the terminal parses out, from the third specific content, the comprehensive system information including the some or all content of the system information, and further acquires the system configuration information.

Optionally, the base station further includes a first setting unit 82 configured to set a reserved bit of the broadcast channel according to the first specific content, the second specific content, and the third specific content, and/or identify the first specific content, the second specific content, and the third specific content using a corresponding bit of the broadcast channel.

Optionally, the narrowband configuration information includes information about a narrowband location, and the base station further includes a first dividing unit 83 configured to perform division according to the broadcast channel to obtain the narrowband location; and a second setting unit 84 configured to set a reserved bit of the broadcast channel according to a quantity of the narrowbands, and send the broadcast channel to the broadcasting unit 81.

Optionally, the ePDCCH configuration information includes information about an ePDCCH location, and the base station further includes a second dividing unit 85 configured to perform division according to the broadcast channel to obtain the ePDCCH location; and a third setting unit 86 configured to set a reserved bit of the broadcast channel according to a quantity of ePDCCHs, and send the broadcast channel to the broadcasting unit.

Optionally, the first control information includes the time-frequency resource used by the terminal to receive the second specific content, and the base station further includes a third dividing unit 87 configured to perform division according to the broadcast channel to obtain a time-frequency resource used when the specific content is sent to the terminal, and send an indication to a first sending unit; and the first sending unit 88 configured to, after receiving the indication sent by the third dividing unit, send the specific content to the terminal using the time-frequency resource obtained through division.

Optionally, the second control information includes the time-frequency resource used by the terminal to receive the third specific content, and the base station further includes a fourth dividing unit 89 configured to perform division according to the broadcast channel to obtain a time-frequency resource used when the second specific content is sent to the terminal, and send an indication to a second sending unit; and the second sending unit 810 configured to, after receiving the indication of the fourth dividing unit, send the second specific content to the terminal using the time-frequency resource for transferring the second specific content.

Optionally, the broadcast channel is a PBCH or an ePBCH.

Optionally, the base station further includes a fourth dividing unit 811 configured to select the coding scheme and the redundancy version of the second specific content in the first control information according to the broadcast channel, and/or configured to select the coding scheme and the redundancy version of the third specific content in the second control information.

According to the base station provided in this embodiment, PBCH information broadcast by a broadcasting unit is not only used for transferring basic physical layer configuration information of a cell, but also used for transferring specific content agreed between a terminal and the base station, such that manners for transferring information between the base station and the terminal are diversified. Especially, for a terminal that does not support a PDCCH, a base station can still transfer information to the terminal.

An embodiment of the present application provides a system for transferring information between a base station and a terminal, including any base station and any terminal that are described in the foregoing embodiments.

According to the system for transferring information between a base station and a terminal provided in this embodiment, PBCH information broadcast by a broadcasting unit on a base station side is not only used for transferring basic physical layer configuration information of a cell, but also used for transferring various specific content agreed between the terminal and the base station, and the terminal receives the PBCH information sent by the base station, and acquires required specific content, such that manners for transferring information between the base station and the terminal are diversified. Especially, for a terminal that does not support a PDCCH, a base station can still transfer information to the terminal.

In this embodiment of the present application, corresponding content may be indicated using a combination of any bits in 24-bit binary code of the PBCH information, which may be set according to an actual requirement in the implementation process of the foregoing solutions, and is not limited in the present application.

The technical solutions described in the embodiments of the present application are mainly applied to an LTE system.

Based on the foregoing descriptions of the implementation manners, a person skilled in the art may clearly understand that the present application may be implemented by software in addition to necessary universal hardware or by hardware only. In most circumstances, the former is a preferred implementation manner. Based on such an understanding, the technical solutions of the present application may be implemented in a form of a software product. The computer software product is stored in a readable storage medium, such as a floppy disk, a hard disk or an optical disc of a computer, and includes several instructions for instructing a computer device (which may be a personal computer, a server, or a network device) to perform the methods described in the embodiments of the present application.

The foregoing descriptions are merely specific implementation manners of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A communication system, comprising:
a network device configured to:
set system frame number (SFN) information and first content in a message, wherein the first content comprises first control information that indicates a manner in which a terminal device receives second content; and
send the message on a physical broadcast channel; and
the terminal device configured to:
receive the message on the physical broadcast channel from the network device;
parse out the first control information from the first content; and
use the first control information to access a network.

2. The communication system of claim 1, wherein the network device is further configured to send the second content comprising configuration information, wherein the terminal device requires the configuration information to access the network, and wherein the terminal device is further configured to receive the second content from the network device in the manner indicated in the first control information.

3. The communication system of claim 2, wherein the second content comprises second control information that indicates a manner in which the terminal device receives third content, wherein the terminal device is further configured to parse out, from the second content, the second control information, and wherein the second control information indicates a manner in which the terminal device receives third content.

4. The communication system of claim 3, wherein the network device is further configured to send, via the third content in the manner indicated in the second control information, configuration information, and wherein the terminal device requires the configuration information to access the network.

5. The communication system of claim 3, wherein the terminal device is further configured to:
receive the third content in the manner indicated in the second control information; and
obtain the configuration information from the third content, and wherein the terminal device requires the configuration information to access the network.

6. The communication system of claim 5, wherein the third content comprises comprehensive system information comprising some or all content of system information, and wherein the terminal device is further configured to parse out, from the third content, comprehensive system information comprising some or all of the content.

7. The communication system of claim 3, wherein the network device is further configured to:
set at least one bit of the physical broadcast channel according to each of the first content, the second content, and the third content; and
identify each of the first content, the second content, and the third content using a corresponding bit of the physical broadcast channel.

8. The communication system of claim 3, wherein the second content indicates a time-frequency resource, a coding scheme and a redundancy version, according to which the terminal device receives third specific content from the base station.

9. The communication system of claim 3, wherein the third content includes narrowband configuration information, and wherein the narrowband configuration information comprises information indicating a narrowband location.

10. The communication system of claim 1, wherein the second content comprises comprehensive system information comprising some or all content of system information, and wherein the terminal device is further configured to parse out, from the second content, the comprehensive system information comprising some or all of the content.

11. The communication system of claim 1, wherein the first control information indicates a time-frequency resource on which the terminal device receives the second content.

12. A communication method, comprising:
setting, by a network device, system frame number (SFN) information and first content in a message, wherein the first content comprises first control information that indicates a manner in which a terminal device receives second content;

sending, by the network device, the message on a physical broadcast channel;

receiving, by the terminal device, the message on the physical broadcast channel;

parsing out, by the terminal device, the first control information from the first content; and using, by the terminal device, the first control information to access a network.

13. The communication method of claim 12, wherein the second content comprises comprehensive system information comprising some or all content of system information, wherein the communication method further comprises parsing out, by the terminal device, the comprehensive system information from the second content, and wherein the comprehensive system information comprises some or all of the content.

14. The communication method of claim 12, further comprising:

sending, by the network device via the second content, configuration information, wherein the configuration information is required by the terminal device to access the network; and receiving, by the terminal device, the second content from the network device in a manner indicated in the first control information.

15. The communication method of claim 14, wherein the second content comprises second control information that indicates a manner in which the terminal device receives third content, wherein the communication method further comprises parsing out, by terminal device, the second control information from the second content, and wherein the second control information indicates a manner in which the terminal device receives third content.

16. The communication method of claim 15, further comprising sending, by the network device in the manner indicated in the second control information, configuration information via the third content, wherein the terminal device requires the configuration information to access the network.

17. The communication method of claim 15, further comprising:

setting, by the network device, at least one bit of the physical broadcast channel according to each of the first content, the second content, and the third content; and identifying, by the network device, each of the first content, the second content, and the third content using a corresponding bit of the physical broadcast channel.

18. The communication method of claim 15, further comprising:

receiving, by the terminal device, the third content in the manner indicated in the second control information; and obtaining, by the terminal device, the configuration information from the third content, wherein the terminal device requires the configuration information to access the network.

19. The communication method of claim 18, wherein the third content comprises comprehensive system information comprising some or all content of system information, wherein the communication method further comprises parsing out, by the terminal device, comprehensive system information from the third content, and wherein the comprehensive system information comprises some or all the content.

20. The communication method of claim 15, wherein the second content indicates a time-frequency resource, a coding scheme and a redundancy version, according to which the terminal device receives third specific content from the base station.

21. The communication method of claim 15, wherein the third content includes narrowband configuration information and the narrowband configuration information comprises information indicating a narrowband location.

22. The communication method of claim 12, wherein the first control information indicates a time-frequency resource on which the terminal device receives the second content.

* * * * *